United States Patent
Vasseur et al.

(10) Patent No.: US 9,225,616 B2
(45) Date of Patent: Dec. 29, 2015

(54) FEEDBACK-BASED TUNING OF CONTROL PLANE TRAFFIC BY PROACTIVE USER TRAFFIC OBSERVATION

(75) Inventors: Jean-Philippe Vasseur, Saint Martin d'Uriage (FR); Sukrit Dasgupta, Norwood, MA (US); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 13/562,000

(22) Filed: Jul. 30, 2012

(65) Prior Publication Data

US 2014/0029432 A1    Jan. 30, 2014

(51) Int. Cl.
    *H04L 12/26*     (2006.01)
    *H04L 1/00*     (2006.01)
    *G01R 31/08*     (2006.01)
    *H04L 12/24*     (2006.01)
    *H04L 12/721*     (2013.01)

(52) U.S. Cl.
    CPC ............ *H04L 41/5025* (2013.01); *H04L 45/70* (2013.01)

(58) Field of Classification Search
    CPC .................................................. H04L 45/028
    See application file for complete search history.

(56) References Cited

U.S. PATENT DOCUMENTS

| | | | |
|---|---|---|---|
| 6,425,105 B1 * | 7/2002 | Piirainen et al. | 714/748 |
| 6,768,718 B1 * | 7/2004 | Beshai et al. | 370/237 |
| 7,222,195 B2 | 5/2007 | Das et al. | |
| 7,536,452 B1 | 5/2009 | Cao et al. | |
| 7,730,201 B1 * | 6/2010 | McAllister et al. | 709/233 |
| 7,773,519 B2 | 8/2010 | Prabhakar et al. | |
| 7,961,621 B2 | 6/2011 | Bergamasco et al. | |
| 1,023,157 A1 | 9/2011 | Vasseur et al. | |
| 8,024,479 B2 | 9/2011 | Das et al. | |
| 8,085,755 B2 * | 12/2011 | Shepherd | 370/351 |
| 8,107,380 B1 * | 1/2012 | Schaff et al. | 370/238 |

(Continued)

FOREIGN PATENT DOCUMENTS

| | | |
|---|---|---|
| EP | 2417719 A1 | 2/2012 |
| EP | 2548343 A1 | 1/2013 |

OTHER PUBLICATIONS

J.Tripathi et al. , A performance evaluation study of RPL: Routing Protocol for low power and lossy networks, IEEE, 2010, entire document.*

(Continued)

*Primary Examiner* — Maharishi Khirodhar
(74) *Attorney, Agent, or Firm* — Parker Ibrahim & Berg LLC; James M. Behmke; Stephen D. LeBarron

(57) ABSTRACT

In one embodiment, a management device may determine whether user traffic in a computer network is suffering from insufficient network resources. In response to user traffic suffering from insufficient network resources, the device may then trigger the computer network to reduce control plane traffic. In another embodiment, a network device may transmit control plane traffic into a computer network at a first rate. In response to receiving instructions to reduce control plane traffic due to user traffic suffering from insufficient network resources, the device may then transmit control plane traffic into the computer network at a reduced second rate.

25 Claims, 5 Drawing Sheets

(56) References Cited

U.S. PATENT DOCUMENTS

| | | | |
|---|---|---|---|
| 8,493,860 B2* | 7/2013 | Racz et al. | 370/235 |
| 2003/0043745 A1* | 3/2003 | Kano et al. | 370/238 |
| 2003/0128690 A1* | 7/2003 | Elliott et al. | 370/351 |
| 2009/0006647 A1* | 1/2009 | Balonado et al. | 709/238 |
| 2009/0238070 A1 | 9/2009 | Rivers et al. | |
| 2010/0302941 A1 | 12/2010 | Prabhakar et al. | |
| 2011/0273983 A1 | 11/2011 | Bergamasco et al. | |
| 2012/0155475 A1* | 6/2012 | Vasseur et al. | 370/400 |

OTHER PUBLICATIONS

J. Tripathi et al., A performance evaluation study of RPL: Routing Protocol for low power and lossy networks, IEEE, 2010, entire document.*

Winter, et al., "RPL: IPv6 Routing Protocol for Low-Power and Lossy Networks", IETF Request for Comments 6550, Mar. 2012, 158 pages.

* cited by examiner

FEEDBACK-BASED TUNING OF CONTROL PLANE TRAFFIC BY PROACTIVE USER TRAFFIC OBSERVATION

TECHNICAL FIELD

The present disclosure relates generally to computer networks, and, more particularly, to managing congestion affected by control plane traffic.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. For example, link capacity is usually extremely limited (e.g., several kbits/s) and time-varying link characteristics can cause a tension between sending additional control messages to quickly adapt to the changing connectivity and sending too much control traffic that adversely affects the data plane traffic and consequently the Service Level Agreement (SLA) of the user traffic. This state can quickly make the network unstable and communications very difficult as a recursive situation of react-and-reconfigure starts to develop because of increasing control traffic and congestion arising from it.

In particular, there are situations where if the control plane traffic is too high (network management, routing, etc.) this may severely impact the user traffic service level. Furthermore, under circumstances where there are user traffic spikes in addition to heavy control plane traffic, this may lead to severe instability in the network. For example, the routing protocol may try to adapt the routing topology, thus leading to more control traffic which may even further impact the user traffic service level, etc., thus causing another form of congestion collapse.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
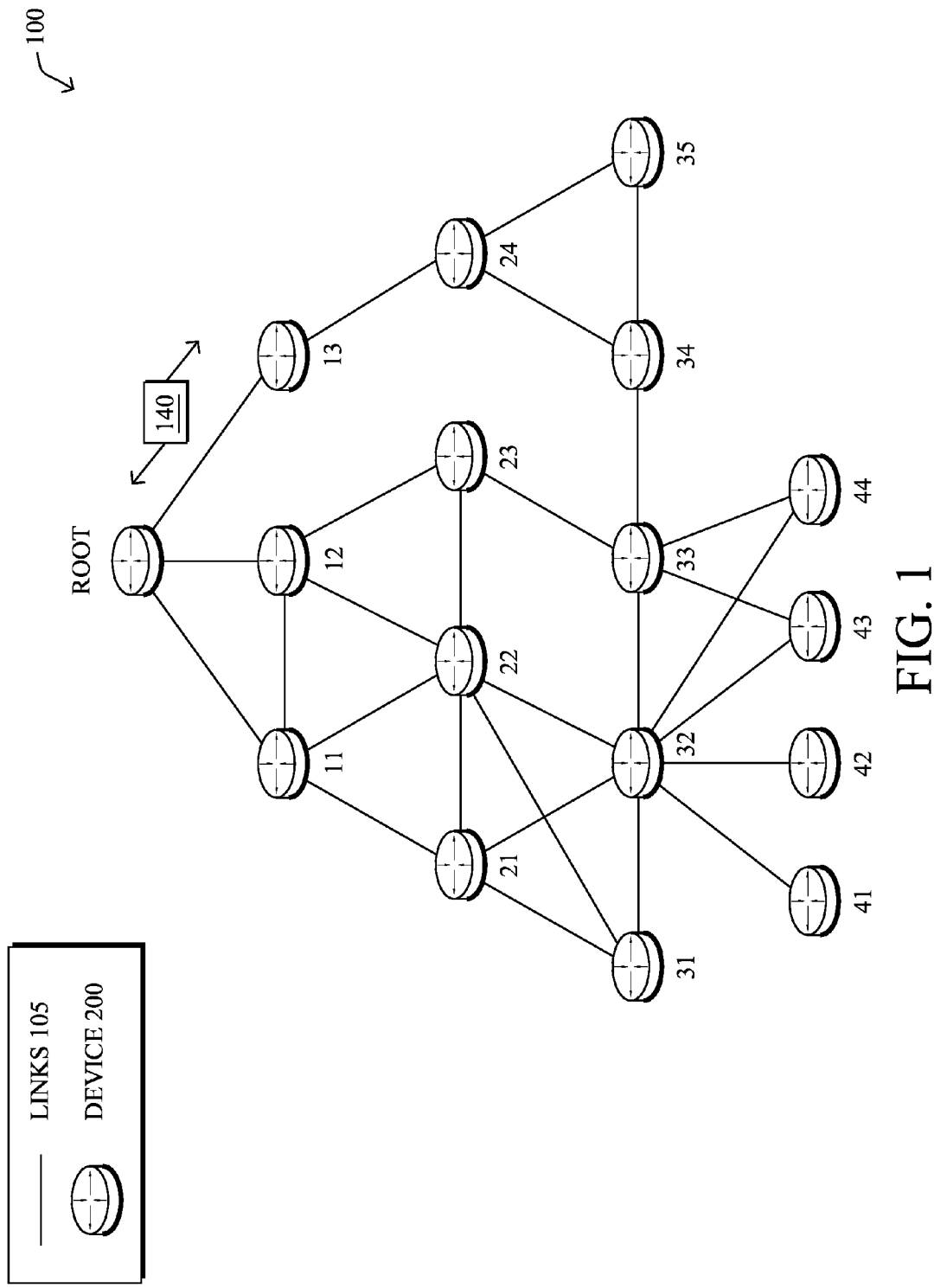
FIG. 1 illustrates an example communication network.

According to one or more embodiments of the disclosure, a management device may determine whether user traffic in a computer network is suffering from insufficient network resources. In response to user traffic suffering from insufficient network resources, the device may then trigger the computer network to reduce control plane traffic.

According to one or more additional embodiments of the disclosure, a network device may transmit control plane traffic into a computer network at a first rate. In response to receiving instructions to reduce control plane traffic due to user traffic suffering from insufficient network resources, the device may then transmit control plane traffic into the computer network at a reduced second rate.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "44," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
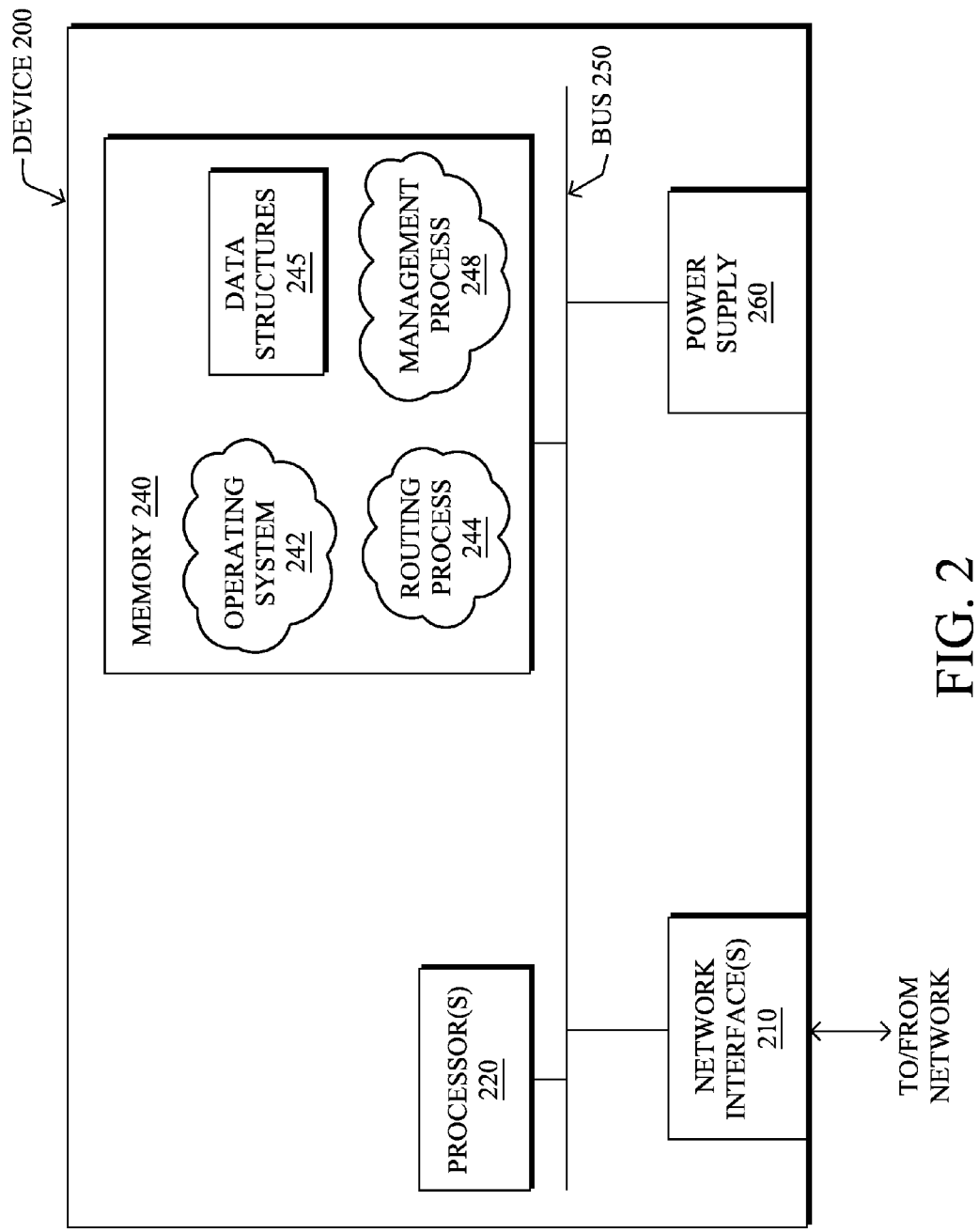
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative "management" process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain mesh or sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IPv6), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built based on an Objective Function (OF). The role of the Objective Function is generally to specify rules on how to build the DAG (e.g. number of parents, backup parents, etc.).

As noted above, various challenges are presented with LLNs, such as lossy links, low bandwidth, battery operation, low memory and/or processing capability, etc. For example, link capacity is usually extremely limited (e.g., several kbits/s) and time-varying link characteristics can cause a tension between sending additional control messages to quickly adapt to the changing connectivity and sending too much control traffic that adversely affects the data plane traffic. This state can quickly make the network unstable and communications very difficult as a recursive situation of react-and-reconfigure starts to develop because of increasing control traffic and congestion arising from it.

In particular, there are situations where if the control plane traffic is too high (network management, routing, etc.) this may severely impact the user traffic service level. Furthermore, under circumstances where there are user traffic spikes in addition to heavy control plane traffic, this may lead to severe instability in the network. For example, the routing protocol may try to adapt the routing topology, thus leading to more control traffic which may even further impact the user traffic service level, etc., thus causing another form of congestion collapse.

For instance, link bandwidth in LLNs is often so limited that despite all of the efforts to reduce the control plane traffic with a protocol such as RPL or even reactive protocols such as AODVv2 or Load-ng that try to buffer source route for long period of time, it has been observed that the routing control plane traffic may not be negligible. It is especially true during periods where links are highly unstable or where path costs vary significantly. This may lead to the very undesirable effect of increasing the control plane traffic overhead (which usually has a higher class of service). This in turn leads to less bandwidth for user traffic resulting in increased congestion, packet drops and retransmissions. These adverse side-effects in turn may lead to topology changes as routing control packets also get dropped even with QoS (quality of service) enabled. For example, in most cases, links are shared such as with RF links or PLC links thus collisions may be inevitable. Thus a highly detrimental cycle of instability is formed where useful traffic flow is close to negligible.

Control Plane Traffic Management

The techniques herein proactively observe user traffic for signs of congestion or other indicators of insufficient resources, and take corrective measures by tuning the control plane traffic, accordingly. The state of the network may be sampled periodically so that there is some feedback into the corrective mechanism and a stable state can be maintained. In particular, the control plane traffic may be dynamically adjusted according to the network congestion state when it is observed that the user traffic suffers from insufficient network resources (e.g., achieved based on packet inspections, user traffic volume observations, congested reports, etc.). The techniques herein allow a management device/controller such as a DAG root (or NMS) to put the network (or a region of the network) in Low Maintenance mode, thus significantly decreasing (or even stopping) control plane traffic (according to some policy) in order to free up network resources for the user traffic and increase network topology stability.

Specifically, according to one or more embodiments of the disclosure as described in detail below, a management device may determine whether user traffic in a computer network is suffering from insufficient network resources. In response to user traffic suffering from insufficient network resources, the device may then trigger the computer network to reduce control plane traffic. According to one or more additional embodiments of the disclosure as described in detail below, a network device may transmit control plane traffic into a computer network at a first rate. In response to receiving instructions to reduce control plane traffic due to user traffic suffering from insufficient network resources, the device may then transmit control plane traffic into the computer network at a reduced second rate.

Illustratively, the techniques described herein may be performed by hardware, software, and/or firmware, such as in accordance with the network management process 248, which may contain computer executable instructions executed by the processor 220 to perform functions relating to the techniques described herein, e.g., in conjunction with routing process 244. For example, the techniques herein may be treated as extensions to conventional protocols, such as the various routing protocols, and as such, may be processed by similar components understood in the art that execute those protocols, accordingly.

Operationally, a first aspect of the techniques herein consists of using a management device such as a Border Router/Field Area Router/Root node/etc. to identify those flows in the network that are experiencing a low delivery rate or significantly increased delays. This can be achieved in several ways. Some factors that will govern whether the network has insufficient resources for user traffic range from the type of application traffic, processing constraints or implementation requirements and restrictions either at the user end, the DAG root, a node observing traffic in the network (since in most cases traffic transits through the node), the NMS or a combination of all of the above. A few mechanisms that can be used are now described:

1) Deep Packet Inspection (DPI) of application data (e.g., meter data, timestamped packets used for time sensitive applications, etc.) in the packets.

If details about the application data is known and there is a mechanism by which the application marks multiple transmission of the same data, then DPI can be used to determine the number of transmission retry iterations. Information regarding counts and timestamps can thus be maintained for every source. This mechanism can be effective even when the UDP is the underlying transport technology.

2) Maintaining source statistics based on packet data.

A hashing function uses the source and destination IP addresses as the key (or any other set of keys that could give more information on the path rather than the source) and stores a portion of the application data in the corresponding bucket (what part of the data is stored is generally irrelevant as long as it is the same in every retransmitted packet; it could be the first or the last X bytes, for example). This entry may also be time-stamped and counted so a time-based profile can be maintained. Note that the use of storing counts and timestamps will be explained below. For incoming packets, if the value in the bucket corresponding to the key is the same as that in the data section of the packet, the count will be increased. If the value in the bucket is different, the count will be reset and a new timestamp will be recorded. Also, timestamps, counts and bucket entries may be reset periodically after they are first populated so as to not keep stale values that are of little value.

3) Tracking TCP parameters.

If the application uses TCP as the underlying transport technology, there may be no need to inspect the application data. TCP packets maintain details of the current state such as transmission windows, sequence numbers etc. Using this information and by observing the sequence number of the current packets, the management node may be able to determine quite accurately the number of retransmits.

4) Observing control packet volume.

This concept mostly represents the state of the network close to the root. If there is a sudden spike in the number of packets close to the root, it is probably due to some network event (e.g., broadcast alarm storms are well known events). Such a situation can be used as a trigger for the root to start proactively reacting to a potential outage event.

A second aspect of the techniques according to one or more embodiments herein involves the determination of nodes that are either contributing directly to the congestion (active contributor) or are adding to congestion (by changing metrics, neighbors, etc.) in reaction to behavior of the active contributors (passive contributor). An approximate list of active contributors can be determined based on the timestamps captured above. When environmental factors (such as interference from other sources, rain, static electricity, etc.) start to affect the channel, some sources will start to react before others. This behavior would generally hold true even more so if the environmental influence is localized (e.g., interference from local electrical sources). Correlating the timestamps with the routing topology (e.g., DAG information on the root) will allow a rough localization of issue. This inference will then allow reacting effectively towards isolation of the issue.

Figure 3:
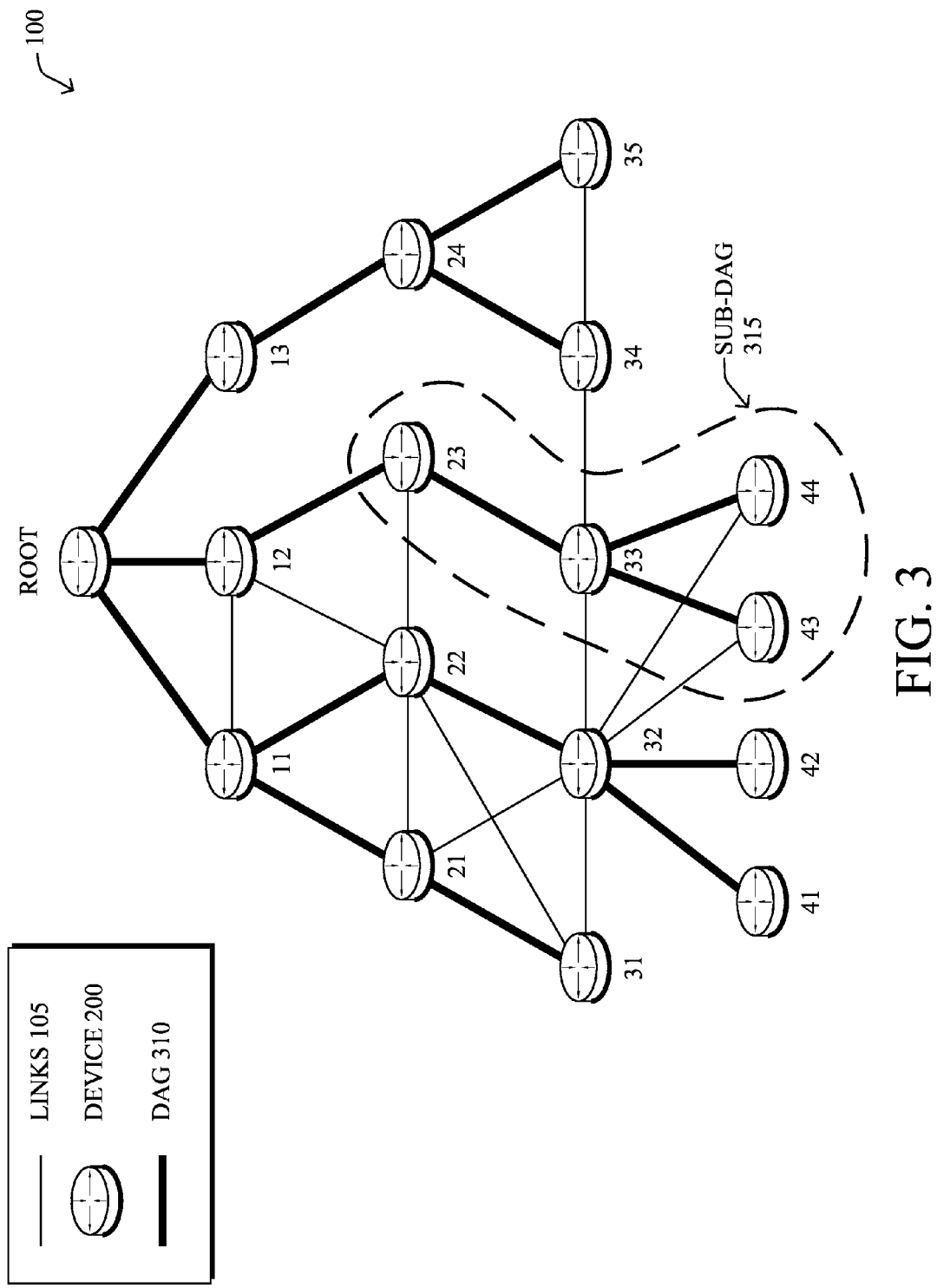
FIG. 3 illustrates an example directed acyclic graph (DAG) and sub-DAG within the network of FIG. 1.

Said differently, it is possible by observing the user traffic to identify the set of nodes in the network (e.g., in the DAG) that are experiencing congestion by correlating the gathered information with the routing topology (DAG), which is available on the FAR. This allows for applying localization of the techniques herein to a sub-DAG as opposed to the entire DAG. For example, as shown in FIG. 3, a DAG 310 is shown, where an example sub-DAG 315 may be located "beneath" node 23 (including nodes 23, 33, 43, and 44). Note that the techniques herein may be applied on a per-node basis, a set of nodes (e.g., a sub-DAG), or the entire DAG, depending on the degree of knowledge of the set of nodes experiencing congestion.

A third aspect of the techniques herein is to react to the observations such that the state of the network can be improved. At this stage, certain variables may be used to track the various system attributes and represent the parameters that will be used to trigger reactive mechanisms.

In one embodiment, the techniques herein denote the delivery rate of every node Ni as DR(Ni). If the delivery rate DR(Ni)<Threshold_1, then the node Ni is flagged as a congested node. Note that the techniques herein can infer from the time-stamping mechanism above the time sorted order of congested nodes.

In another embodiment, the techniques herein use statistical learning methods to identify the expected behavior of data traffic flows. The data traffic may then be classified based on whether the current behavior is expected or not. In one view, statistical learning methods may be used to dynamically adjust Threshold_1 above. In another view, statistical learning methods may be used to determine when data flows are not behaving as expected and control traffic should be reduced (e.g., lower than expected data traffic may be due to congestion while higher than expected data traffic may require additional capacity).

Note that if the number of flagged nodes in the network exceeds a Threshold_2, the management device (e.g., root) may send out a message requesting the network to stop all transmission related to control plane traffic and to take several actions related to routing topology adjustment as described below (or at least strongly deferring any transmission of control packets in the networks). The receipt of notification to reduce control traffic puts each node in the network in a "low maintenance" control plane mode (called LM mode), wherein each node in the network may perform one or more of the following set of actions (as instructed):

1) Optional network management packets are no longer sent (e.g., link statistic CoAP packets are buffered for further delivery until the DAG root indicates that the network must exit from the LM mode, or selectively dropped if determined as low priority according to policy)

2) Routing updates (particularly in the case of RPL used as a routing protocol) are highly limited to only report major changes; more explicitly, nodes:

Stop updating the routing cost of their local links upon receiving DIO message in order to avoid any DAG topology change that itself triggers the sending of DAO messages (or only update path cost in case of major changes)

No parent change is performed, even if a node determines that the preferred parent no longer provides the best path, in order to avoid any DAO refresh (or triggering a parent change if and only if the path cost decrease is major). Note that selection of another PAN may also be forbidden when the network is in LM state.

In another embodiment, the set of actions listed above (e.g., only advertise new metric if changes is more than x %, only select a new parent if path cost decrease is above y %, only send CoAP packets of type T when the network is in Low Maintenance (LM) mode, etc.) can be communicated as a policy upon registration (e.g., using a configured dynamic host configuration protocol (DHCP) message).

In another embodiment of the LM mode, such as where the illustrative RPL protocol is used, the DAG root may continue to send DIO LM indication packets. Upon receiving such a packet each node would trigger a dampening exponential back-off algorithm for sending control plane traffic instead of simply stopping sending all non-essential packets.

In another mode of operation, the management device (e.g., DAG root) may determine that all nodes experiencing congestion are localized based on timestamp correlation and retransmit count. In such a case it may be preferable to only place a portion (e.g., sub-DAG) of the network in LM mode as opposed to the entire network (e.g., DAG). For example, for DAG-based routing, the DAG root may first identify the common ancestor "owning" the sub-DAG. Once that common ancestor has been identified the DAG Root sends a newly specified message requesting the node to locally trigger a DIO to put its sub-DAG in the LM mode.

A fourth aspect of the techniques herein provides for a feedback engine that may be used to take periodic snapshots of the state of the network during normal and favorable operation, as well as during high congestion states where high control traffic volume exists. One snapshot may illustratively capture enough parameters so that the entire characteristic of the network is represented. As an example, it could contain a sample of the volume of traffic at the root, mean/max sub-DAG congestion levels, number of DAO packets received, DIO packets sent out, etc. To maintain the feedback engine as a computationally lightweight function, one or more embodiments herein may categorize the samples of the state into either of two classes: stable or unstable, using a suitable classification algorithm. With each sample taken, the techniques herein can thus determine where the state of the system is headed. If a few consecutive samples are heading towards "unstable", the reactive mechanism above may be activated. This feedback mechanism thus ensures favorable and stable operating conditions for the network. Said differently, the techniques herein provide a 2-state approach, where once congestion is detected, a dual threshold mechanism may be used to move to the "low-control-plane" state and move back to the regular mode of operation when congestion has been released. For instance, the feedback mechanism may illustratively control a simple 2-state finite state machine (FSM), with little or no risk of oscillation or instability.

Figure 4:
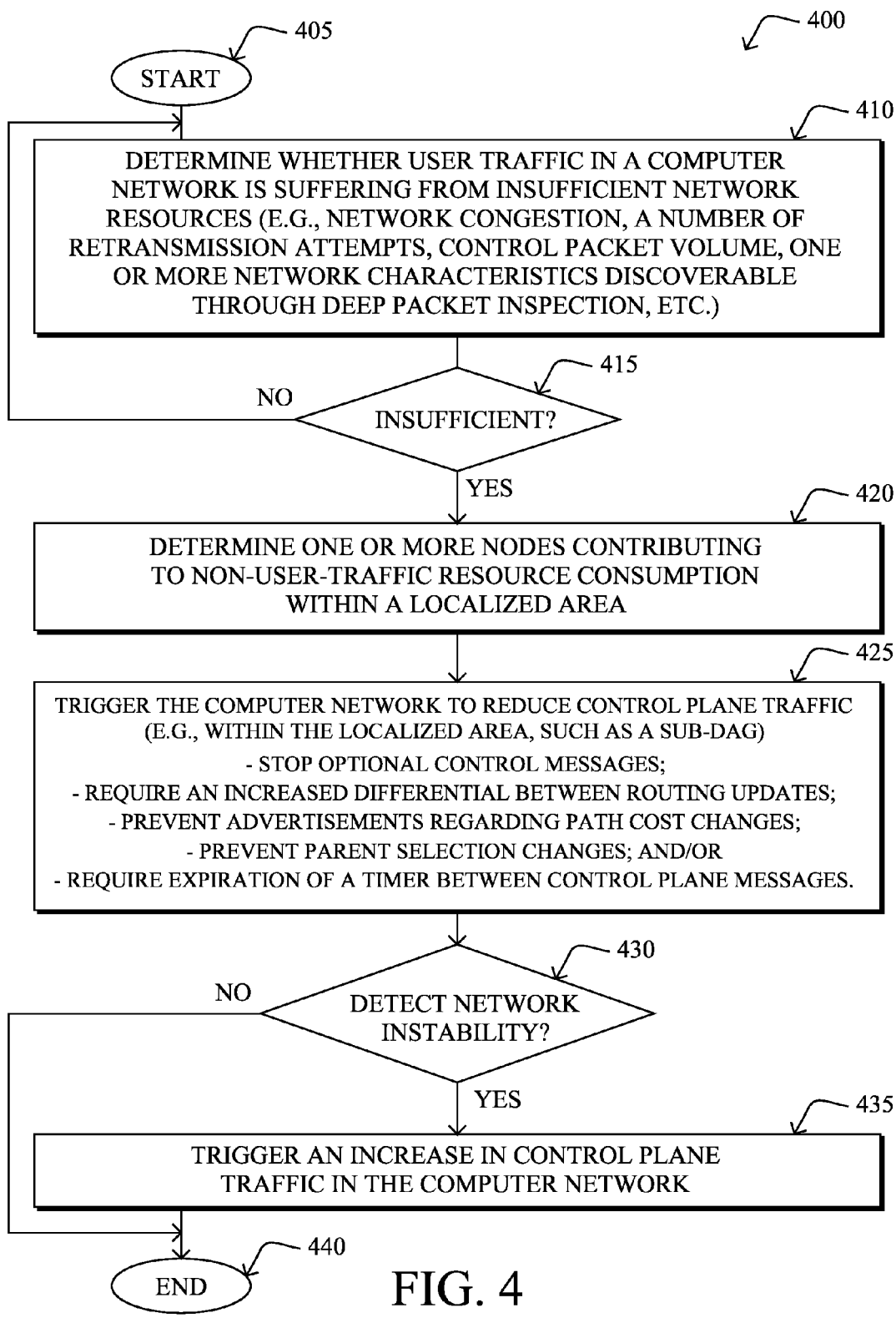
FIG. 4 illustrates an example simplified procedure for feedback-based tuning of control plane traffic by proactive user traffic observation in a communication network, particularly from the perspective of a management device.

FIG. 4 illustrates an example simplified procedure 400 for feedback-based tuning of control plane traffic by proactive user traffic observation in a communication network in accordance with one or more embodiments described herein, particularly from the perspective of a management device. The procedure 400 may start at step 405, and continues to step 410, where, as described in greater detail above, the management device may determine whether user traffic in a computer network is suffering from insufficient network resources. For example, as described above, such determination may be based on network congestion, degradation of the level of quality of service for specific flows, a number of retransmission attempts, control packet volume, one or more network characteristics discoverable through deep packet inspection, etc. If the resources are insufficient in step 415 (e.g., in response to various thresholds above), then in step 420 the management node may optionally determine one or more nodes contributing to non-user-traffic resource consumption within a localized area (e.g., sub-DAG). In step 425, the management node may then trigger the computer network to reduce control plane traffic (e.g., within the localized area, such as a sub-DAG). As detailed above, reduction in control plane traffic may consist of any one or more of the following illustrative factors:

stopping optional control messages;
requiring an increased differential between routing updates;
preventing advertisements regarding path cost changes;
preventing parent selection changes; and/or
requiring expiration of a timer between control plane messages (e.g., messages related to network management).

Note that in certain embodiments, in response to detecting network instability in step 430 as described above, the management device may also trigger an increase in control plane traffic in the computer network in step 435, e.g., restoring the network to its original state. The procedure 400 illustratively ends in step 440, though notably may continue to monitor for insufficient resources for user traffic (e.g., being consumed by control plane traffic), accordingly.

Figure 5:
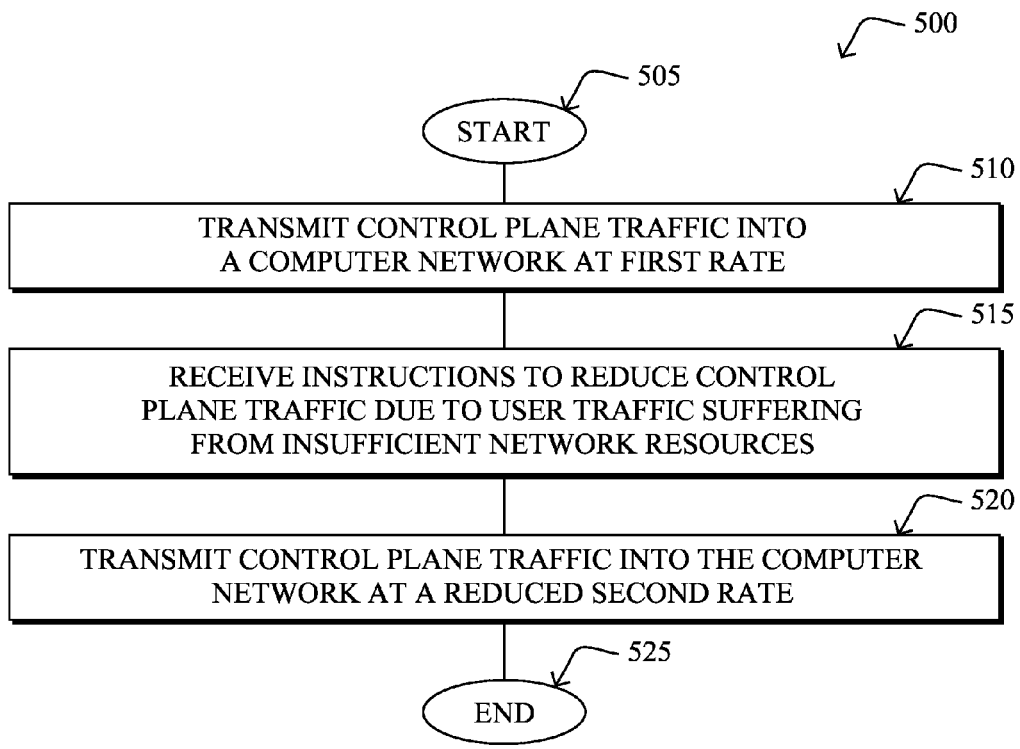
FIG. 5 illustrates an example simplified procedure for feedback-based tuning of control plane traffic by proactive user traffic observation in a communication network, particularly from the perspective of a network device.

In addition, FIG. 5 illustrates an example simplified procedure 500 for feedback-based tuning of control plane traffic by proactive user traffic observation in a communication network in accordance with one or more embodiments described herein, particularly from the perspective of a network device. The procedure 500 may start at step 505, and continues to step 510, where, as described in greater detail above, the device may transmit control plane traffic into a computer network at a first rate (e.g., a conventional, non-reduced rate). In response to receiving instructions to reduce control plane traffic due to user traffic suffering from insufficient network resources in step 515 as described herein, then in step 520 the device may begin to transmit control plane traffic into the computer network at a reduced second rate. For example, as described above, the reduced rate may be based on stopping optional control messages, requiring an increased differential between routing updates, preventing advertisements regarding path cost changes, preventing parent selection changes, requiring expiration of a timer between control plane messages, etc. The simplified procedure 500 may then end in step 525, notably with the option of returning to step 510 to resume control plane traffic at the first rate (e.g., in response to further instruction from the management device, as described herein).

It should be noted that while certain steps within procedures 400-500 may be optional as described above, the steps shown in FIGS. 4-5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400-500 are described separately, certain steps from each procedure may be incorporated into each other procedure, and the procedures are not meant to be mutually exclusive.

The techniques described herein, therefore, provide for feedback-based tuning of control plane traffic by proactive user traffic observation in a communication network. In particular, the techniques herein manage the percentage of network resources used by the control plane traffic when it is observed that the network becomes congested where as a result the user traffic experiences low delivery rates, increased delays, etc. By putting the network in a low maintenance state for the control plane traffic (routing, management, etc.), the techniques herein allow for allocating more network resources for the user traffic for a period of time thus improving the service levels (SLAs) for the user traffic, improving the stability of the network (avoiding loss of control plane traffic that may lead to routing instability), still without compromising the long term efficiency of routing and network management.

While there have been shown and described illustrative embodiments that provide for feedback-based tuning of control plane traffic by proactive user traffic observation, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks (whether constrained or not) and/or protocols. In addition, while certain routing protocols are shown as examples for control plane traffic, such as RPL, other suitable routing/control protocols may be used, accordingly. Notably, use of a DAG, in particular, is merely one example routing topology configuration, and is also not meant to limit the scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    identifying, at a management device in a computer network, traffic originating from a user in the computer network, the user traffic representing a subset of all traffic in the computer network and control plane traffic representing another subset of all of the traffic in the computer network;
    determining, at the management device, when the identified user traffic is suffering from insufficient network resources based on a feedback engine in the management device, wherein the feedback engine uses periodic snap-shots of the computer network to determine that the identified user traffic is suffering from insufficient network resources; and
    in response to determining based on the feedback engine that the identified user traffic is suffering from insufficient network resources, triggering, at the management device, the computer network to dynamically reduce control plane traffic to free up network resources for the identified user traffic and increase network topology stability.

2. The method as in claim 1, wherein determining whether user traffic in a computer network is suffering from insufficient network resources comprises:
    determining a factor of the computer network selected from a group consisting of: network congestion; degradation of the level of quality of service for specific flows; a number of retransmission attempts; control packet volume; and one or more network characteristics discoverable through deep packet inspection.

3. The method as in claim 1, further comprising:
    determining one or more nodes contributing to non-user-traffic resource consumption within a localized area; and
    triggering the reduced control plane traffic within the localized area.

4. The method as in claim 3, wherein the computer network is arranged as a directed acyclic graph (DAG) and wherein the localized area is a sub-DAG.

5. The method as in claim 1, wherein triggering the reduced control plane traffic comprises:
    stopping optional control messages.

6. The method as in claim 1, wherein triggering the reduced control plane traffic comprises:
    requiring an increased differential between routing updates.

7. The method as in claim 1, wherein triggering the reduced control plane traffic comprises:
    preventing advertisements regarding path cost changes.

8. The method as in claim 1, wherein triggering the reduced control plane traffic comprises:
    preventing parent selection changes.

9. The method as in claim 1, wherein triggering the reduced control plane traffic comprises:
    requiring expiration of a timer between control plane messages.

10. The method as in claim 1, further comprising:
    detecting network instability with the reduced control plane traffic; and, in response, triggering an increase in control plane traffic in the computer network.

11. The method as in claim 1, wherein the management device is a device selected from a group consisting of: a root node; a network management server (NMS); a border router; and a field area router (FAR).

12. An apparatus, comprising:
    one or more network interfaces to communicate with a computer network;
    a processor coupled to the network interfaces and adapted to execute one or more processes; and
    a memory configured to store a process executable by the processor, the process when executed operable to:
        identify traffic originating from a user in the computer network, the user traffic representing a subset of all traffic in the computer network and control plane traffic representing another subset of all of the traffic in the computer network;
        determine when the identified user traffic is suffering from insufficient network resources based on a feedback engine in the management device, wherein the feedback engine uses periodic snap-shots of the computer network to determine that the identified user traffic is suffering from insufficient network resources; and in response to a determination based on the feedback engine that the identified user traffic suffering from insufficient network resources, trigger the computer network to dynamically reduce control plane traffic to free up network resources for the identified user traffic and increase network topology stability.

13. The apparatus as in claim 12, wherein the process when executed to determine whether user traffic in a computer network is suffering from insufficient network resources is further operable to:

determine a factor of the computer network selected from a group consisting of: network congestion; degradation of the level of quality of service for specific flows; a number of retransmission attempts; control packet volume; and one or more network characteristics discoverable through deep packet inspection.

14. The apparatus as in claim 12, wherein the process when executed is further operable to:

determine one or more nodes contributing to non-user-traffic resource consumption within a localized area; and trigger the reduced control plane traffic within the localized area.

15. The apparatus as in claim 14, wherein the computer network is arranged as a directed acyclic graph (DAG) and wherein the localized area is a sub-DAG.

16. The apparatus as in claim 12, wherein the process when executed to trigger the reduced control plane traffic is further operable to:

stop optional control messages.

17. The apparatus as in claim 12, wherein the process when executed to trigger the reduced control plane traffic is further operable to:

require an increased differential between routing updates.

18. The apparatus as in claim 12, wherein the process when executed to trigger the reduced control plane traffic is further operable to:

prevent advertisements regarding path cost changes.

19. The apparatus as in claim 12, wherein the process when executed to trigger the reduced control plane traffic is further operable to:

prevent parent selection changes.

20. The apparatus as in claim 12, wherein the process when executed to trigger the reduced control plane traffic is further operable to:

require expiration of a timer between control plane messages.

21. The apparatus as in claim 12, wherein the process when executed is further operable to:

detect network instability with the reduced control plane traffic; and, in response, trigger an increase in control plane traffic in the computer network.

22. The apparatus as in claim 12, wherein the apparatus is a management device selected from a group consisting of: a root node; a network management server (NMS); a border router; and a field area router (FAR).

23. A method, comprising:

transmitting, from a network device in a computer network, control plane traffic into the computer network at a first rate;

receiving, at the network device, instructions from a management device to dynamically reduce control plane traffic due to traffic that is identified as originating from a user, the identified user traffic determined to be suffering from insufficient network resources based on a feedback engine in the management device and representing a subset of all traffic in the computer network and the control plane traffic representing another subset of all of the traffic in the computer network; and in response to receiving instructions to dynamically reduce control plane traffic, transmitting, from the network device, control plane traffic into the computer network at a reduced second rate to free up network resources for the identified user traffic and increase network topology stability, wherein the feedback engine uses periodic snap-shots of the computer network to determine that the identified user traffic is suffering from insufficient network resources.

24. The method as in claim 23, wherein the reduced second rate of control plane traffic comprises at least one of:

stopping optional control messages;

requiring an increased differential between routing updates;

preventing advertisements regarding path cost changes;

preventing parent selection changes; and requiring expiration of a timer between control plane messages.

25. An apparatus, comprising:

one or more network interfaces to communicate with a computer network;

a processor coupled to the network interfaces and adapted to execute one or more processes; and a memory configured to store a process executable by the processor, the process when executed operable to:

transmit control plane traffic into the computer network at a first rate;

receive instructions from a management device to dynamically reduce control plane traffic due to traffic that is identified as originating from a user, the identified user traffic determined to be suffering from insufficient network resources based on a feedback engine in the management device and representing a subset of all traffic in the computer network and the control plane traffic representing another subset of all of the traffic in the computer network; and in response to the instructions to reduce control plane traffic, transmit control plane traffic into the computer network at a reduced second rate to free up network resources for the identified user traffic and increase network topology stability, wherein the feedback engine uses periodic snap-shots of the computer network to determine that the identified user traffic is suffering from insufficient network resources.

* * * * *